United States Patent
Vo et al.

(10) Patent No.: US 9,228,070 B2
(45) Date of Patent: Jan. 5, 2016

(54) HIGH STRENGTH EXTRUDED THERMOPLASTIC POLYMER FOAM

(75) Inventors: Van-Chau Vo, Wollerau (CH); Alain Sagnard, Lachen (CH); John Gordon-Duffy, Horgen (CH)

(73) Assignee: Dow Global Technologies LLC, Midland, MI (US)

( * ) Notice: Subject to any disclaimer, the term of this patent is extended or adjusted under 35 U.S.C. 154(b) by 183 days.

(21) Appl. No.: 13/884,997

(22) PCT Filed: Dec. 14, 2011

(86) PCT No.: PCT/US2011/064758
§ 371 (c)(1),
(2), (4) Date: May 13, 2013

(87) PCT Pub. No.: WO2012/091918
PCT Pub. Date: Jul. 5, 2012

(65) Prior Publication Data
US 2013/0266766 A1 Oct. 10, 2013

Related U.S. Application Data

(60) Provisional application No. 61/427,232, filed on Dec. 27, 2010.

(51) Int. Cl.
*B29C 44/04* (2006.01)
*C08J 9/00* (2006.01)
*B29C 44/50* (2006.01)
*C08J 9/12* (2006.01)
*C08J 9/14* (2006.01)
*B29C 44/20* (2006.01)
*C08J 9/04* (2006.01)

(52) U.S. Cl.
CPC . *C08J 9/00* (2013.01); *B29C 44/20* (2013.01); *B29C 44/50* (2013.01); *C08J 9/04* (2013.01); *C08J 9/122* (2013.01); *C08J 9/141* (2013.01); *C08J 9/146* (2013.01); *C08J 2201/03* (2013.01); *C08J 2203/06* (2013.01); *C08J 2203/14* (2013.01); *C08J 2203/142* (2013.01); *C08J 2300/22* (2013.01); *C08J 2325/06* (2013.01); *Y10T 428/24504* (2015.01)

(58) Field of Classification Search
CPC ...... B29C 44/20; B29C 44/30; B29C 44/302; B29C 47/0042; C08J 9/228; C08J 9/08; C08J 9/06
See application file for complete search history.

(56) References Cited

U.S. PATENT DOCUMENTS

| | | | | |
|---|---|---|---|---|
| 3,922,328 A | * | 11/1975 | Johnson | 264/46.1 |
| 4,022,557 A | | 5/1977 | Johnson | |
| 4,465,649 A | * | 8/1984 | Johnson | 264/51 |
| 4,510,268 A | * | 4/1985 | Tonokawa et al. | 521/146 |
| 2003/0105176 A1 | * | 6/2003 | Haas et al. | 521/79 |
| 2004/0001946 A1 | | 1/2004 | Ma et al. | |
| 2005/0281999 A1 | * | 12/2005 | Hofmann et al. | 428/304.4 |
| 2008/0287560 A1 | * | 11/2008 | Loh | B82Y 30/00 521/79 |
| 2011/0064938 A1 | * | 3/2011 | Breindel | B82Y 30/00 428/315.5 |

FOREIGN PATENT DOCUMENTS

| | | | | |
|---|---|---|---|---|
| FR | WO 2010101747 A2 | * | 9/2010 | B29C 44/26 |
| WO | 2009127803 | | 10/2009 | |
| WO | WO 2009127803 A2 | * | 10/2009 | |
| WO | 2010101747 | | 9/2010 | |

OTHER PUBLICATIONS

"Corecell T-Foam: Structural Foam Core." SP Gurit, The Wayback Machine, Apr. 26, 2009, <http://www.gurit.com:80/core/core_picker/download.asp?documenttable=libraryfiles&id=961>, accessed Feb. 19, 2015.*

Sara Black, Getting to the Core of Copmosite Laminates, Composite Technology, Oct. 2003.

* cited by examiner

*Primary Examiner* — Stella Yi
(74) *Attorney, Agent, or Firm* — Steven W. Mork

(57) ABSTRACT

Prepare extruded thermoplastic polymer foam by preparing a foamable polymer mixture containing thermoplastic polymer and blowing agent at a mixing pressure, cooling the foamable polymer mixture and extruding it through a foaming die at a die pressure at least 90 bars lower than the mixing pressure and out through a die opening having cross sectional dimensions of 2.5 millimeter or more and a cross sectional area of at least 700 square millimeters at a flow rate greater than 500 kilograms per hour and allow it to expand into a polymer foam between shaping elements while restraining the extrusion rate with a restraining device so as to form polymer foam having 96 volume percent or less void volume, anisotropic cell size, a thickness of 50 millimeter or greater, compressive and tensile moduli in the thickness dimension greater than 35 mega pascals and an average shear modulus greater than 16 mega pascals.

12 Claims, No Drawings

HIGH STRENGTH EXTRUDED THERMOPLASTIC POLYMER FOAM

BACKGROUND OF THE INVENTION

1. Field of the Invention

The present invention relates to extruded thermoplastic polymer foam having high strength and thickness and a process for preparing such polymer foam.

2. Description of Related Art

High strength structural polymer foams have value in demanding applications such as boat hulls and windmill blades. Polymer foams are desirable for such applications because of their combination of relatively light weight yet high strength, as well as their ability to be cut, shaped and molded to desired shapes and sizes.

Despite their value, there are limited commercially available options for high strength structural polymer foams and those that are available tend to be expensive and create disposal challenges. Crosslinked polyvinylchloride (PVC) foam has been a long-standing option in this market and is available under trade-names such as Airex™ structural foam (Airex is a trademark of 3A Composites GmbH). Crosslinked PVC foam provides desirable strength and weight, but has disposal challenges. Extensive crosslinking precludes the foam from being recycled by melting and reintroducing into a foaming process. Crosslinked PVC structural foam might be able to be reprocessed to some degree by grinding it up and using it in limited amounts as filler material in some processes, but recycling it by reintroducing it into a process as a melt is not possible.

Styrene-acrylonitrile (SAN) copolymer foam is also available on the market as high strength structural polymer foam. Examples of SAN structural foam include Corecell™ brand structural foams (Corecell is a trademark of Gurit Limited Corporation). SAN structural foam offers an alternative to crosslinked PVC foam for high strength applications such as windmill blades and offers an advantage of enhanced tensile properties due to less crosslinking than the PVC alternative. However, preparing SAN structural foam is a time consuming multistep process, which is relatively expensive to operate. SAN structural foam processes are generally batch processes that require forming an initial sample of SAN polymer mixture that contains a blowing agent, pouring the mixture into metal molds and allowing it to partially cure under high heat and pressure to produce a rubbery mass (an "amoeba" or "embryo") that is demolded and then placed into a second mold and heated again in an expansion chamber that controls the dimension in which the rubbery mass can expand so as to form a final foam having anisotropic cell dimensions. (see, for example: Sara Black, *Getting to the Core of Composite Laminates*, COMPOSITES TECHNOLOGY, October 2003 (available over the Internet at www.compositesworld.com/articles/getting-to-the-core-of-composite-laminates) and PCT publication WO 2009/127803 A2). The anisotropic cell dimensions and relatively high density (low void volume) of the resulting foam result in stiffness and strength properties that are desirable for structural polymer foam.

It would be desirable to identify a continuous extrusion process for preparing structural polymer foam in order to make the production process more efficient and less expensive. It would further be desirable for such a process to produce thermoplastic polymer foam that can be recycled. Use of structural foam in wind mill or wind turbine applications to produce green energy compromises the green aspect of the device if the material in the blades cannot be recycled and must be disposed of in land fills.

In particular, it would especially be desirable to identify a continuous extrusion process for directly extruding a structural thermoplastic polymer foam that has a thickness of at least 50 millimeters, a density of at least 45 kilograms per cubic meter and void volume of 96 volume-percent or less, an average shear modulus between the thickness/length (xz) and thickness/width (xy) dimensions that is greater than 16 mega pascals (MPa), a tensile modulus in the thickness (x) dimension that is greater than 35 MPa and a compressive modulus in the thickness (x) dimension that is greater than 35 MPa as a single board. Of particular interest is such a process that produces polymer foam that can be recycled by melting and introducing back into an extrusion foam process.

BRIEF SUMMARY OF THE INVENTION

The present invention provides a continuous extrusion process for preparing structural polymer foam. The process is particularly useful for preparing extruded thermoplastic structural polymer foam that can be recycled. The process can directly produce thermoplastic polymer foam having a thickness of at least 50 millimeters, a density of at least 45 kilograms per cubic meter and void volume of 96 volume-percent or less (based on total foam volume), an average shear modulus between the thickness/length (xz) and thickness/width (xy) dimensions that is greater than 16 mega pascals (MPa), a tensile modulus in the thickness (x) dimension that is greater than 35 MPa and a compressive modulus in the thickness (x) dimension that is greater than 35 MPa as a single extruded board.

Part of the difficulty that the present invention overcomes is discovering a way to extrude thermoplastic foam having a thickness of at least 50 millimeters while maintaining a void volume of 96 volume-percent or less and further while achieving the desired modulus properties. Achieving extruded foam with such a thickness typically requires extensive expansion with a blowing agent, resulting in a void volume well in excess of 96 volume-percent. Moreover, the necessary modulus properties require anisotropic cell sizes having cell sizes large in the foam thickness dimension than in any dimension orthogonal to the foam thickness dimension. The process of the present invention unexpectedly and surprisingly accomplishes both of these achievements—thickness of at least 50 millimeters with a void volume of 96 volume-percent or less and sufficient cell size anisotropy to achieve the desired modulus values—in a continuous extrusion process through specific methods of controlling expansion of an extruded foamable mixture into polymer foam. The present invention results from discovering that these desired properties and characteristics are achievable with the extrusion process parameters of the present invention.

In a first aspect, the present invention is an extrusion foam process, the process comprising preparing at a mixing pressure a foamable polymer mixture comprising a thermoplastic polymer and a blowing agent, cooling the foamable polymer mixture and extruding it in an extrusion direction through a foaming die at a die pressure and out of the foaming die through a die opening at a flow rate into an atmosphere of low enough pressure to allow the foamable polymer mixture to expand into a polymer foam while traveling in the extrusion direction at an extrusion rate, the extrusion foam process being further characterized by: (a) the die pressure being at least 90 bars lower than the mixing pressure; (b) all cross sectional dimensions of the die opening being at least 2.5 millimeters and the cross sectional area of the die opening being at least 700 square millimeters; (c) the flow rate of the foamable polymer mixture through the die opening being greater than 500 kilograms per hour; (d) the foamable polymer mixture expands between restraining elements positioned immediately after the foaming die; (e) a device positioned after the restraining elements that restrains the extrusion rate of the polymer foam relative to its unrestrained extrusion rate; and wherein the polymer foam characterized by having a continuous thermoplastic polymer matrix defining cells therein, a void volume of 96 volume percent or less based on total polymer foam volume, a cell size dimensional ratio in the polymer foam thickness dimension to its width and length dimension that is greater than one, and a thickness of 50 millimeters or more, a compressive modulus and tensile modulus in the thickness dimension that is greater than 35 mega pascals and an average shear modulus between its thickness/width and thickness/length dimension that is greater than sixteen mega pascals.

In a second aspect, the present invention is an extruded thermoplastic polymer foam comprising a continuous thermoplastic polymer matrix defining cells therein and characterized by having a void volume of 96 percent or less based on total polymer foam volume, a cell size dimensional ratio in the polymer foam thickness dimension to any orthogonal polymer foam dimension that is greater than one; a thickness of 50 millimeters or more; a compressive modulus and tensile modulus in the thickness dimension that is greater than 35 mega pascals and an average shear modulus between thickness/width and thickness/length dimensions that is greater than 16 mega pascals.

The process of the present invention is useful for making preparing the polymer foam of the present invention that is useful, for example, in the construction of windmill or wind turbine blades or the construction of boat hulls.

DETAILED DESCRIPTION OF THE INVENTION

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institute für Normung; and ISO refers to International Organization for Standards.

Foam articles have three mutually perpendicular dimensions: length (z-dimension), width (y-dimension) and thickness (x-dimension). The length dimension lies along the longest dimension of a foam article and typically is along the extrusion direction of an extruded foam article. The thickness dimension is the dimension that has the smallest magnitude but can be equal to the length in, for example, a cube. Width is mutually perpendicular to length and thickness and can have a magnitude equal to or less than the length and equal to or greater than the thickness.

"And/or" means "and, or as an alternative". "Multiple" means "two or more". All ranges include endpoints unless otherwise indicated.

The polymeric foam of the present invention is an extruded polymeric foam comprising a continuous thermoplastic polymer matrix that defines multiple cells therein. Extruded thermoplastic polymer foam has a continuous, generally uniform matrix network of thermoplastic polymer. The matrix of thermoplastic polymer serves as cell walls that define cells within the matrix. An extruded polymer foam is distinct from, for example, expanded "bead" foam structures. Expanded bead foam structures contain bead skins throughout the foam structure that surround groups of foam cells within the polymer foam structure. Bead skins are relatively dense walls of polymer, relative to other cell walls, that correspond to the bead shell prior to expanding into a foam structure. The bead skins coalesce during expansion and molding to form a foam structure comprising multiple beads of foam defined by dense bead skins and, as a result, have a network of bead skins that extend throughout the resulting foam structure enclosing groups of cells. Extruded polymer foam is free of bead skin structure extending throughout the foam structure and enclosing groups of cells.

The extruded thermoplastic polymer foam of the present invention is a single layer of foam as opposed to a structure comprising multiple laminated foams. One of the surprising and desirable features of the process of the present invention is that it can extrude a single polymer foam having a thickness of 50 millimeters or more while having the void volume and particularly desirable high strength properties defined below. The extruded thermoplastic polymer foam of the present invention can be laminated to additional polymer foam, but is itself characterized by the thickness and properties defined herein apart from any additional layers of polymer foam.

The thermoplastic polymer matrix of the extruded thermoplastic polymer foam desirably comprises a continuous phase of alkenyl aromatic polymer. The thermoplastic polymer matrix can comprise 60 percent by weight (wt %) or more, preferably 70 wt % or more, still more preferably 80 wt % or more, even 90 wt % or more alkenyl aromatic polymer based on total weight of polymer in the thermoplastic polymer matrix. Suitable alkenyl aromatic polymers include those selected from polystyrene homopolymers and styrenic copolymers. Desirable styrenic copolymers comprise greater than 50 wt % copolymerized styrene monomer based on copolymer weight. One desirable styrenic copolymer is a copolymer of styrene and acrylonitrile (styrene/acrylonitrile (SAN) copolymer). The SAN copolymer desirably comprises 30 wt % or less, preferably 20 wt % or less and can comprise 15 wt % or less copolymerized acrylonitrile based on SAN copolymer weight.

The alkenyl aromatic polymer can be 50 wt % or more, preferably 60 wt % or more, still more preferably 70 wt % or more, even more preferably 80 wt % or more and can be 90 wt % or more and even 100 wt % polystyrene homopolymer based on total alkenyl aromatic polymer weight. Alternatively, the alkenyl aromatic polymer can be 60 wt % or more, 70 wt % or more, 80 wt % or more and even 90 wt % or more or 100 wt % styrenic copolymer (for example, SAN copolymer or any other styrenic copolymer) based on total alkenyl aromatic polymer weight. In one particularly desirable embodiment, the thermoplastic polymer matrix comprises a continuous phase of polystyrene homopolymer having a weight-averaged molecular weight (Mw) of at least 140,000 grams per mole.

In order to achieve recyclability, the thermoplastic polymer matrix of the present invention is essentially free from crosslinking. That means that the polymer matrix contains less than five wt %, preferably one wt % or less and can be free from residual and/or bound crosslinking additives based on total thermoplastic polymer weight. Crosslinking additives include compounds that induce crosslinking such as dicumyl peroxide and divinyl benzene. Residual crosslinking additives are unreacted while bound crosslinking additives are bound to the thermoplastic polymer.

The cells constitute voids in the polymer foam. The extruded thermoplastic polymer foam of the present invention is characterized by having a void volume of 96 volume-percent (vol %) or less. At the same time, it is desirable for the thermoplastic polymer foam to have a void volume of 85 vol % or more for economical practicability. Determine the void volume using the following calculation:

$$\text{Void Volume (vol \%)} = 100\% \times [(\text{polymer density}) - (\text{foam density})]/(\text{polymer density})$$

Such a relatively low void volume corresponds to a relatively high density as compared to thermally insulating polymer foam. The density of the present foam is 45 kilograms per cubic meter ($kg/m^3$) or higher, preferably 50 $kg/m^3$ or higher, still more preferably 55 $kg/m^3$ or higher. Determine foam density according to ASTM method D1622.

The cells have an anisotropic cell size. The ratio of cell size in the polymer foam's thickness dimension to the cell size in either the polymer foam's width or length dimensions is greater than one. That means that the cells, on average, have a larger dimension in the foam thickness dimension than in the foam's width and length dimensions. Desirably, the average ratio of cell size in the x-dimension to y-dimension and the x-dimension to z-dimension ("average cell size anisotropy") and preferably the ratio of cell size in both the x and y-dimension and x and z-dimensions is 1.1 or greater, preferably 1.2 or greater. The anisotropic cell size helps establish the desirable physical properties of the polymer foam in terms of compressive modulus, tensile modulus and shear modulus.

The polymer foam has a thickness of 50 millimeters (mm) or more, preferably, 70 mm or more, still more preferably 75 mm or more, and even more preferably 90 mm or more, and yet more preferably 100 mm or more. One of the surprising features of the process of the present invention is its ability to prepare an extruded foam having a thickness of 50 millimeters or more at the specified void volume and modulus values of the present invention. Typically, extruded foam requires extensive expansion in order to achieve thicknesses of 50 mm or more so such a thick foam would have a void volume in excess of 96 vol %. To be clear, foam thickness is that of a single foam as opposed to a combination of foams laminated together whether the laminated structure occurs during extrusion (such as the when extruding multiple sheets of foamable polymer mixture through a die with multiple slits and the extrudate melt-welds together during expansion) or after extrusion (such as when gluing or welding independently extruded foam sheets together). That said, the present foam can be laminated to at least one other polymer foam to create a laminated structure.

As a result of the low void volume and anisotropic cell size the thermoplastic polymer foam of the present invention has particularly desirable strength properties. In particular, the thermoplastic polymer foam of the present invention has a compressive modulus and tensile modulus in the thickness dimension that is greater than 35 mega pascals (MPa). Desirably, the compressive modulus and/or tensile modulus in the thickness dimension is greater than 38 MPa. Determine compressive modulus according to EN826. Determine tensile modulus according to EN1607. Concomitantly, the average of the shear modulus in the thickness/width dimension and the thickness/length dimension of the thermoplastic polymer foam of the present invention is greater than 16 MPa and preferably 17 MPa or greater. Measure shear modulus according to EN12090.

Desirably, the thermoplastic polymer foam has an open cell content of less than 10%, preferably 5% or less, still more preferably 2% or less, even 1% or less. The thermoplastic polymer foam can have an open cell content of 0%. Determine open cell content according to ASTM method D6226-05.

Desirably, the thermoplastic polymer foam has an average directional cell size of 0.10 mm or greater, preferably 0.15 mm or greater. Moreover, it is desirable that the average directional cell size is 2.0 mm or less. Determine average directional cell size according to ASTM D3576.

The thermoplastic polymer foam of the present invention can further include one or more than one additive including flame retardants, colorants, infrared absorbers and infrared attenuators, nucleators, fillers, as well as processing aids such as lubricants. Additives are typically present at a concentration of ten wt % or less based on total polymer weight in the polymer foam.

The process of the present invention is an extrusion process suitable for preparing the thermoplastic polymer foam of the present invention. The extrusion process includes preparing a foamable polymer mixture of a softened thermoplastic polymer and a blowing agent at a mixing temperature and mixing pressure. The mixing temperature is sufficient to maintain the thermoplastic polymer in a softened state and the mixing pressure is sufficiently high so as to preclude foaming or expansion of the blowing agent. Preparation of the foamable polymer mixture typically occurs in an extruder. The process further includes cooling the foamable polymer mixture and extruding to and through a foaming die. The pressure ("die pressure") of the foamable polymer mixture 50 centimeters prior to the foaming die opening (exit opening of the foaming die) is lower than the mixing pressure and the temperature of the foamable polymer mixture in the die is lower than the mixing temperature. The pressure outside the die is lower than the die pressure and low enough to allow the foamable polymer mixture to expand into polymer foam. Typically, the pressure outside the die is atmospheric pressure or can also be sub-atmospheric pressure.

The thermoplastic polymer is as described for the thermoplastic polymer matrix of the thermoplastic polymer foam of the present invention, including all preferred and desirable embodiments of the thermoplastic polymer matrix. For instance, the thermoplastic polymer desirably comprises a continuous phase of alkenyl aromatic polymer such as polystyrene homopolymer, a styrenic copolymer, or a combination thereof. In one particularly desirable embodiment, the thermoplastic polymer is a polystyrene homopolymer having a Mw of at least 140,000 grams per mole.

The blowing agent can be any known or yet to be known for use in extruded polymer foam processes, but is desirably selected from a group consisting of carbon dioxide, hydrocarbons having five carbons or less, alcohols have three carbons or less and fluorinated hydrocarbons including 1,1,1,2 tetrafluoroethane (HFC-134a). Desirably, the hydrocarbon having five carbons or less are selected from butane isomers, more desirably is iso-butane. At the same time, the alcohol is desirably ethanol. Preferably, the blowing agent is selected from a group consisting of carbon dioxide, iso-butane, ethanol and HFC-134a.

It is desirable for the blowing agent to comprise carbon dioxide, preferably greater than 10 wt % and still more preferably greater than 50 wt % of the blowing agent is carbon dioxide based on total blowing agent weight. The blowing agent can be 100 wt % carbon dioxide based on total blowing agent weight. Carbon dioxide blowing agent can be present at a concentration in a range of 0.1 to 7.0 wt % based on total polymer weight in the foamable polymer mixture and preferably 0.5 to 5 wt % based on total polymer weight in the foamable polymer mixture.

Blowing agent is present in the foamable polymer mixture at a concentration that is desirably 0.08 moles or more per hundred grams of thermoplastic polymer. At the same time, it is desirable to use less than 0.18 moles per hundred grams of thermoplastic polymer to avoid a risk of achieving an undesirably large void volume (greater than 96 vol %) in the resulting polymer foam.

The foamable polymer mixture is in a softened state, which means it is capable of extruding. It is common to heat a thermoplastic polymer above its glass transition temperature (Tg) in order to bring it into a softened state. Blowing agent can plasticize a thermoplastic polymer and thereby lower the temperature necessary to bring the polymer to a softened state. Carbon dioxide, in particular, is well known to plasticize thermoplastic polymers such as alkenyl aromatic polymers. It is desirable for the foamable polymer mixture to be at a die temperature that is in a range of one degree Celsius or more and 20° C. or less, preferably 15° C. or less, more preferably 10° C. or less, even more preferably eight degrees Celsius or less, and still more preferably five degrees Celsius or less above the glass transition temperature of the thermoplastic polymer comprising the foamable polymer mixture. In particular, when the thermoplastic polymer in the foamable polymer mixture is polystyrene homopolymer it is desirable for the foamable polymer mixture to have a die temperature (temperature of foamable polymer mixture in the die) that is 105° C. or higher and 120° C. or lower.

The process of the present invention incorporates a combination of extrusion conditions that unexpectedly and surprisingly enable direct extrusion of the thermoplastic polymer foam of the present invention when using the foamable polymer mixture as described herein.

The difference in pressure between the mixing pressure and die pressure must be at least 90 bars and can be 100 bars or more, even 110 bars or more, with the mixing pressure being greater than the die pressure. Generally, this difference in pressure is 200 bars or less. This pressure difference is much higher than is typical for an extrusion foaming process and is characteristic of extruding a cooler foamable polymer mixture than is typical.

The foamable polymer mixture exits the foaming die through a die opening having all cross sectional dimensions equal to or exceeding 2.5 millimeters (mm) and have a cross sectional area perpendicular to the extrusion direction of at least 700 square mm. This large of a cross sectional opening is necessary in order to achieve foam having a final thickness of at least 50 mm while keeping the blowing agent efficiency and final void volume in the foam low.

The flow rate of the foamable polymer mixture through the foaming die is greater than 500 kilograms per hour (kg/hr), preferably 600 kg/hr or more, still more preferably 800 kg/hr or more to enable formation of large cross section foam and to maximize foam volume output.

The combination of these three extrusion process characteristics reflect the fact that the process of the present invention extrudes a foamable polymer mixture having a relatively low temperature (foaming temperature) as compared to typical extrusion processes used, for example, for preparing thermally insulating foam. Use of a relatively low foaming temperature allows control of the expansion of the foamable mixture, including control over the blowing agent efficiency while maintaining effective control of cell expansion direction. An object of the present invention is to carefully restrain and control the expansion of blowing agent and foamable polymer mixture in order to minimize the extent of expansion (hence, resulting void volume) as well as to obtain cell size anisotropy.

The properties of the present invention benefit from a relatively low blowing agent efficiency. Blowing agent efficiency is the ratio of achieved void volume in a foam to theoretical void volume achievable in a foam for a given blowing agent concentration. Typically, the blowing agent efficiency for thermally insulating foam is about 85-95%. In the process of the present invention, the blowing agent efficiency is desirably less than 70%, preferably 60% or less, more preferably 55% or less.

In order to achieve the desired cell size anisotropy (larger dimension in foam thickness dimension than width or length dimensions) it is necessary to restrain the extrusion rate in the extrusion direction (direction of foam travel out from the foam die) of the foam during expansion in order to induce expansion in the thickness (x) dimension. One method of restraining extrusion rate in the length dimension is to direct the foam through a puller device that frictionally slows the extrusion rate of the foam in the extrusion direction. For example, directing extruding foam through a puller comprising opposing conveyor belts that contact opposing surfaces of the foam and running at a conveyor rate that is slower than the rate the foam would travel in the extrusion direction if uninhibited by the puller. By restricting foam motion in the extrusion direction forces the foam to expand further primarily in the thickness (x) dimension.

It is also desirable to form the foam in its thickness dimension as it expands using restraining elements such as forming plates positioned immediately after the die and between the foaming die and the device or devices restraining foam extrusion rate. When extruding foam board it is desirable to use parallel plate forming plates above and below the foam, spaced apart by the extruding foam's thickness. Desirably, the spacing between the parallel forming plates is a factor of 5 or more, preferably a factor of 8 or more and more preferably a factor of 10 or greater than the height of the foaming die opening. The forming plates are desirably coated in polytetrafluoroethylene to minimize friction between the forming plates and foam traveling between the forming plates. Forming rollers or a combination of forming plates and rollers can be used instead of just forming plates.

It is desirable to maintain the foamable polymer mixture at a temperature within the die that is within 6° C., preferably within 3° C. of the temperature of the die wall. That means that the foamable polymer mixture is at a relatively uniform temperature and is experiencing minimal shear heating along the die wall during the extrusion process. The uniform temperature is desirable to achieve uniform cell formation within the foam.

EXAMPLES

The following examples further illustrate embodiments of the present invention.

Examples 1 and 2

In an 8-inch (20.32 centimeter) extruder, prepare a polymer mixture by melt-blending at 185° C. 90 wt % of a polystyrene homopolymer characterized by having a Mw of 155,000 grams per mole and a polydispersity (Mw/Mn) of 4.0 (for example PS 641 available from Styron Corporation) and 10 wt % of a polystyrene homopolymer characterized by having a Mw of 195,000 grams per mole and a Mw/Mn of 2.5 (for example PS 680 general purpose polystyrene available from Styron Corporation). In addition to the above polymers, melt-blend in 25 wt % of a granulated recycled polymer obtained by recycling polymeric foams made according to a corresponding process. Determine wt % based relative to total weight parts of polystyrene.

Blend into the polymer mixture the following additives: 1.3 wt % hexabromocyclododecane (HBCD), 0.3 wt % talc, 0.1 wt % tetrasodium pyrophosphate (TSPP), and 0.3 wt % blue colorant. Inject into the polymer mixture 4.3 wt % of a blowing agent at a mixing pressure of 193 bar for Example 1 and 198 bars for Example 2 to create a foamable polymer mixture. The blowing agent consists of 93 wt % carbon dioxide and 7 wt % isobutane based on total blowing agent weight. The concentration of blowing agent is 0.10 moles of blowing agent per 100 grams of thermoplastic polymer.

Cool the foamable polymer mixture using a flat heat exchanger prior to extruding the foamable polymer mixture out through a foaming die. Set the heat exchanger to a temperature of 113° C.

Extrude the foamable polymer mixture through a foaming die into atmospheric pressure. The pressure of the foamable polymer mixture in the die (die pressure) is 83 bars for Example 1 and 88 bars for Example 2.

The foaming die has a rectangular die opening through which the foamable polymer mixture is extruded that has a width of 275 mm. The die opening has a height of 3.19 mm for Example 1 and 3.20 mm for Example 2. The foaming die is set to a temperature of 113° C. The temperature of the foamable polymer mixture is approximately 115° C. The pressure drop in the extrusion line (that is, the mixing pressure minus the die pressure) is 110 bars for both Examples.

Extrude the foamable polymer mixture from the foaming die through the die opening at a rate of 855 kilograms per hour and allow the foamable polymer mixture to expand between polytetrafluoroethylene-coated parallel forming plates positioned above and below (either side of the thickness dimension) the expanding foam directly after the foaming die. The spacing between the parallel forming plates for Example 1 is a factor of 9.3 greater than the die opening height (that is, 29.7 mm) and for Example 2 a factor of 13.6 greater than the die opening height for (that is, 43.5 mm). The forming plates extend for 120-200 millimeters along the extrusion direction of the polymer foam.

The polymer foam continues from the parallel forming plates through a puller mechanism comprising parallel conveyor belts positioned above and below the expanded foam and contacting the polymer foam. Run the puller at a rate that slows the extrusion rate of the polymer foam. For Example 1 use a puller rate of 4.6 meters per minute. For Example 2 use a puller rate of 3.4 meters per minute.

Skive off the opposing skin layers (about 8 mm each side) of the resulting foam to obtain the foam of Example 1 and Example 2. Table 1 provides the properties of the foam for Example 1 and Example 2.

TABLE 1

| Property | Example 1 | Example 2 |
|---|---|---|
| Foam Width (mm) | 687 | 673 |
| Foam Thickness (mm) | 75 | 100 |
| Foam Density (kg/m³) | 49 | 47 |
| Void Volume (vol % of foam volume) | 95 | 96 |
| Cell Size (mm, thickness dimension) | 0.19 | 0.20 |
| Cell Size (mm, length dimension) | 0.11 | 0.12 |
| Cell Size (mm, width dimension) | 0.15 | 0.15 |
| Average Cell Size Anisotropy | 1.5 | 1.5 |
| Open Cell Content (%) | <1% | <1% |
| Concentration of Crosslinking Additive (wt % residual and bound) | 0 | 0 |
| Compressive modulus (MPa, thickness dimension) | 39.1 | 45.2 |
| Tensile modulus (MPa, thickness dimension) | 38.0 | 46.9 |
| Average Shear Modulus in xy and xz dimensions (MPa) | 16.9 | 17.9 |

Examples 3 and 4

The process of Examples 3 and 4 follow in like manner to the processes of Examples 1 and 2 with the following changes.

Prepare a polymer mixture by melt blending a polystyrene homopolymer characterized by having a Mw of 195,000 grams per mole and a Mw/Mn of 2.5 (for example PS 680 general purpose polystyrene available from Styron Corporation) with about 28 wt %, by weight of the polystyrene homopolymer, of recycled polymer a granulated recycled polymer obtained by recycling polymeric foams made according to a corresponding process.

Blend into the polymer mixture the following additives: 0.15 wt % barium stearate, 0.25 wt % blue colorant, 0.10 wt % DOWLEX™ polyethylene resin 2247 (DOWLEX is a trademark of The Dow Chemical Company), 0.20 wt % talc, 0.10 wt % TSPP, and 1.25 wt % HBCD. Inject into the polymer mixture 8.6 wt % of a blowing agent at a mixing pressure of 190 bars to crate a foamable polymer mixture. Wt % is based on total weight of polystyrene homopolymer. The blowing agent consists of 2.3 wt % isobutane, 14 wt % carbon dioxide, 12 wt % ethanol, and 71 wt % 1,1,1,2-tetrafluoroethane based on total blowing agent weight. The concentration of blowing agent is 0.11 moles per 100 grams polystyrene.

Cool the foamable polymer mixture using a flat heat exchanger prior to extruding the foamable polymer mixture out through a foaming die. Set the heat exchanger to a temperature of 109° C.

Extrude the foamable polymer mixture through a foaming die into atmospheric pressure. The pressure of the foamable polymer mixture in the die (die pressure) is 71 bars for Example 3 and 74 bars for Example 4.

The foaming die has a rectangular die opening through which the foamable polymer mixture is extruded that has a width of 290 mm. The die opening has a height of 4.18 mm for Example 3 and 3.89 mm for Example 4. The foaming die is set to a temperature of 109° C. and the temperature of the foamable polymer mixture in the die is 114° C. The pressure in the die (extrusion pressure) is 71 bars for Example 3 and 74 bars for Example 4. The pressure drop in the extrusion line (that is, the mixing pressure minus the die pressure) is 109 bars for Example 3 and 106 bars for Example 4.

Extrude the foamable polymer mixture from the foaming die through the die opening at a rate of 850 kilograms per hour and allow the foamable polymer mixture to expand between parallel forming plates as described for Examples 1 and 2 into polymer foam. The spacing between the parallel forming plates for Example 3 is a factor of 12 greater than the die opening height (that is, 50 mm) and for Example 4 a factor of 9.3 greater than the die opening height for (that is, 36 mm).

The polymer foam continues through a puller as described for Examples 1 and 2. The rate of the puller is 3.7 meters per minute for Example 3 and 4.7 meters per minute for Example 4.

Skive off the opposing skin layers (about 3 to 6 mm each side) of the resulting foam to obtain the foam of Example 3 and Example 4. Table 2 provides the properties of the foam for Example 3 and Example 4.

TABLE 2

| Property | Example 3 | Example 4 |
|---|---|---|
| Foam Width (mm) | 696 | 694 |
| Foam Thickness (mm) | 100 | 75 |

TABLE 2-continued

| Property | Example 3 | Example 4 |
|---|---|---|
| Foam Density (kg/m³) | 57 | 58 |
| Void Volume (vol % of foam volume) | 95 | 94 |
| Cell Size (mm, thickness dimension) | 0.24 | 0.21 |
| Cell Size (mm, length dimension) | 0.17 | 0.16 |
| Cell Size (mm, width dimension) | 0.20 | 0.18 |
| Average Cell Size Anisotropy | 1.3 | 1.2 |
| Open Cell Content (%) | <1 | <1 |
| Concentration of Crosslinking Additive (wt % residual and bound) | 0 | 0 |
| Compressive modulus (MPa, thickness dimension) | 49.5 | 47.4 |
| Tensile modulus (MPa, thickness dimension) | 62.4 | 62.0 |
| Average Shear Modulus in xy and xz dimensions (MPa) | 20.8 | 19.9 |

The invention claimed is:

1. An extrusion foam process, the process comprising preparing at a mixing pressure a foamable polymer mixture comprising a thermoplastic polymer and a blowing agent, cooling the foamable polymer mixture and extruding it in an extrusion direction through a foaming die at a die pressure and out of the foaming die through a die opening at a flow rate into an atmosphere of low enough pressure to allow the foamable polymer mixture to expand into a polymer foam while traveling in the extrusion direction at an extrusion rate, the extrusion foam process being further characterized by:
  a. the die pressure being at least 90 bars lower than the mixing pressure;
  b. all cross sectional dimensions of the die opening being at least 2.5 millimeters and the cross sectional area of the die opening being at least 700 square millimeters;
  c. the flow rate of the foamable polymer mixture through the die opening being greater than 500 kilograms per hour;
  d. the foamable polymer mixture expands between restraining elements positioned immediately after the foaming die;
  e. a device positioned after the restraining elements that restrains the extrusion rate of the polymer foam relative to its unrestrained extrusion rate;

and wherein the polymer foam characterized by having a continuous thermoplastic polymer matrix defining cells therein, a void volume of 96 volume percent or less based on total polymer foam volume, a cell size dimensional ratio in the polymer foam thickness dimension to its width and length dimension that is greater than one, and a thickness of 50 millimeters or more, a compressive modulus and tensile modulus in the thickness dimension that is greater than 35 mega pascals and an average shear modulus between its thickness/width and thickness/length dimensions that is greater than sixteen mega pascals.

2. The process of claim 1, further characterized by the temperature difference between the die and foamable polymer mixture within the die being less than six degrees Celsius.

3. The process of claim 1, further characterized by the pressure difference between the mixing pressure and die pressure being at least 100 bars.

4. The process of claim 1, further characterized by the foamable polymer mixture comprising a blowing agent selected from carbon dioxide, butane isomers, and 1,1,1,2-tetrafluoroethane.

5. The process of claim 4, further characterized by the foamable polymer mixture comprising at least 0.08 moles of blowing agent per hundred grams of thermoplastic polymer.

6. The process of claim 1, further characterized by the foamable polymer mixture comprising polystyrene.

7. The process of claim 6, further characterized by the polystyrene having a weight-averaged molecular weight of 140,000 grams per mole or more.

8. The process of claim 6, further characterized by the foamable polymer mixture comprising carbon dioxide at a concentration in a range of 0.5 to 5 weight-percent based on the thermoplastic polymer in the foamable polymer mixture and the foaming die being at a temperature in a range between 105 and 120 degrees Celsius.

9. An extruded thermoplastic polymer foam comprising a continuous thermoplastic polymer matrix defining cells therein and characterized by having a void volume of 96 percent or less based on total polymer foam volume, a cell size dimensional ratio in the polymer foam thickness dimension to any orthogonal polymer foam dimension that is greater than one; a thickness of 50 millimeters or more; a compressive modulus and tensile modulus in the thickness dimension that is greater than 35 mega pascals and an average shear modulus between thickness/width and thickness/length dimensions that is greater than 16 mega pascals.

10. The extruded thermoplastic polymer foam of claim 9, further characterized by the thermoplastic polymer matrix comprising at least 90 weight-percent polystyrene homopolymer based on total thermoplastic polymer matrix weight.

11. The extruded thermoplastic polymer foam of claim 9, further characterized by having a concentration of residual and bound crosslinking additive that is less than five weight-percent based on total thermoplastic polymer weight.

12. The extruded thermoplastic polymer foam of claim 9, further characterized as having at least one additional polymer foam laminated to it.

* * * * *